United States Patent
Essiembre

[11] 4,022,378
[45] May 10, 1977

[54] HEAT DISTRIBUTION SYSTEM FOR SNOWMOBILE

[76] Inventor: Gilbert Essiembre, 958 Sauve Blvd., St. Eustache, Quebec, Canada

[22] Filed: Mar. 4, 1976

[21] Appl. No.: 663,806

[30] Foreign Application Priority Data
June 9, 1975 United Kingdom ............. 24584/75

[52] U.S. Cl. .......................... 237/12.3 A; 98/2.06; 180/5 R; 165/43
[51] Int. Cl.² ......................................... B60H 1/02
[58] Field of Search ................. 237/12.3 A, 12.3 R, 237/12.6; 165/43; 98/2.05, 2.06, 2.07; 123/142.5 R; 126/204; 180/5 R, 54 A

[56] References Cited
UNITED STATES PATENTS

| | | | |
|---|---|---|---|
| 1,387,131 | 8/1921 | Dean | 237/12.3 A |
| 1,491,744 | 4/1924 | Denny | 237/12.3 A |
| 1,753,615 | 4/1930 | Miller | 237/12.3 A |
| 1,983,907 | 12/1934 | Lindner | 237/12.3 R |
| 2,101,627 | 12/1937 | Nallinger | 237/12.3 A |
| 2,656,904 | 10/1953 | Grenier | 180/5 R |
| 3,644,704 | 2/1972 | Polly, Sr. | 237/12.3 A |
| 3,872,938 | 3/1975 | De Groot | 180/5 R |

*Primary Examiner*—John J. Camby
*Assistant Examiner*—Henry C. Yuen

[57] ABSTRACT

A snowmobile comprising a simple and inexpensive heat distribution system which efficiently supplies heated air to both hands and both feet. This heat distribution system may be readily added to any existing snowmobile and includes a heated air manifold secured to the engine to collect air therefrom, heated air outlets in the form of two foot-rest grilles and two hand heating bowl-shape members, with the latter being secured to the steering handles respectively, air conduits connecting the manifold to the heated air outlets, and a deflector plate mounted in the manifold and adjustably insertable in the path of heated air at the engine to deflect the desired amount of heated air toward the foot-rest grilles and the hand heating bowl-shape members.

4 Claims, 6 Drawing Figures

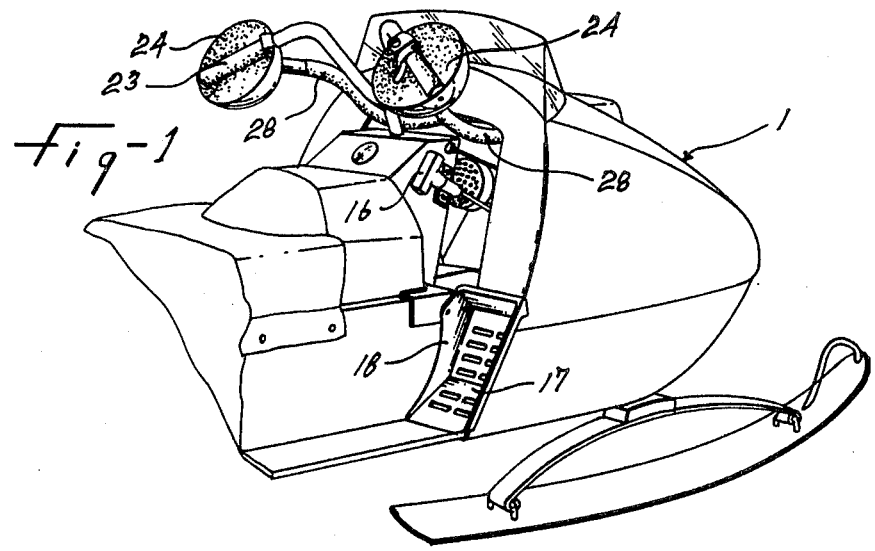
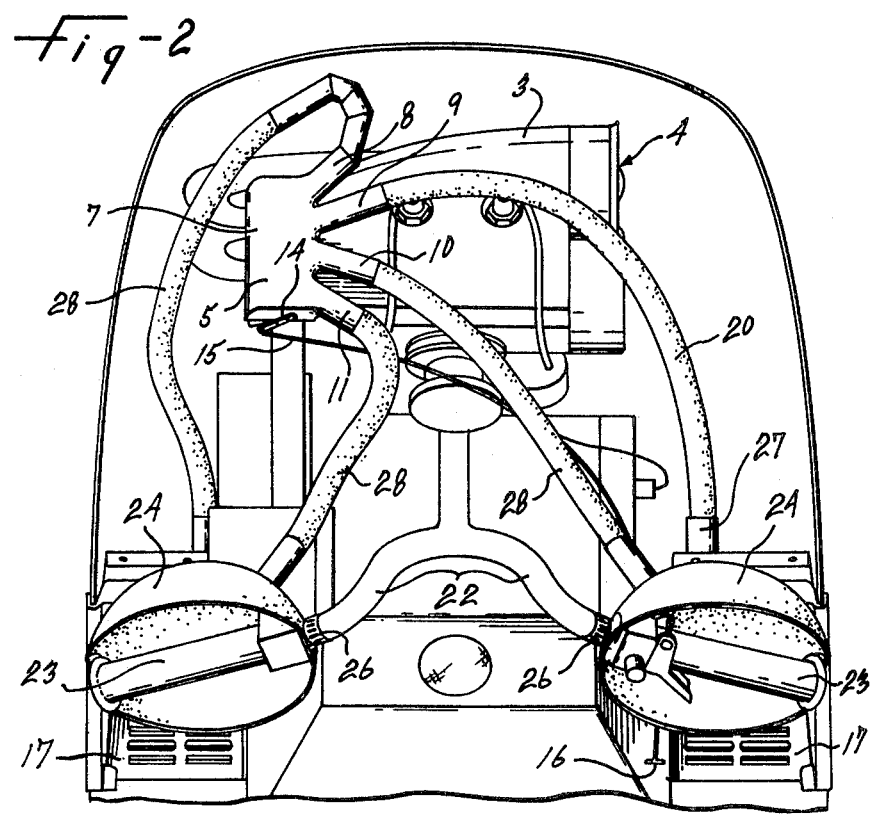

HEAT DISTRIBUTION SYSTEM FOR SNOWMOBILE

This invention relates to snowmobiles and, more particularly, to a system to distribute heated air from the engine, for the comfort of the snowmobile driver.

There has already been proposed to attend to the comfort of the snowmobile driver by distributing heated air from the engine. This has been done by providing a grille at each foot-rest, such that the heated air from the engine compartment is allowed to flow out at the foot-rests to heat the feet of the snowmobile driver. This is not found satisfactory. Besides, there remains the fact that snowmobile drivers still suffer from the cold hands and even from cold feet as well. This is particularly the case for fast and long runs in cold weather as experienced by drivers taking part in snowmobile racing.

It is a general object of the present invention to provide a heat distribution system for a snowmobile, which system is of simple, practical and inexpensive construction and may be readily added to an existing snowmobile to efficiently heat the hands and feet of the driver operating the snowmobile.

It is another general object of the present invention to provide a heat distribution system for a snowmobile which is adapted as a mere addition to an existing snowmobile without altering the original structure thereof.

It is further object of the present invention to provide a heat distribution system for a snowmobile, which system includes heat outlets that are arranged at the steering handles to avoid hindrance of the movements of the hands.

The above and other objects and advantages of the present invention will be better understood with the following detailed description of a preferred embodimet thereof which is illustrated, by way of example, in the accompanying drawings, in which:

FIG. 1 is a perspective view of the front portion of a snowmobile embodying a heat distribution system according to the present invention;

FIG. 2 is a top view of the front portion of the snowmobile with the hood open;

Figure 3:
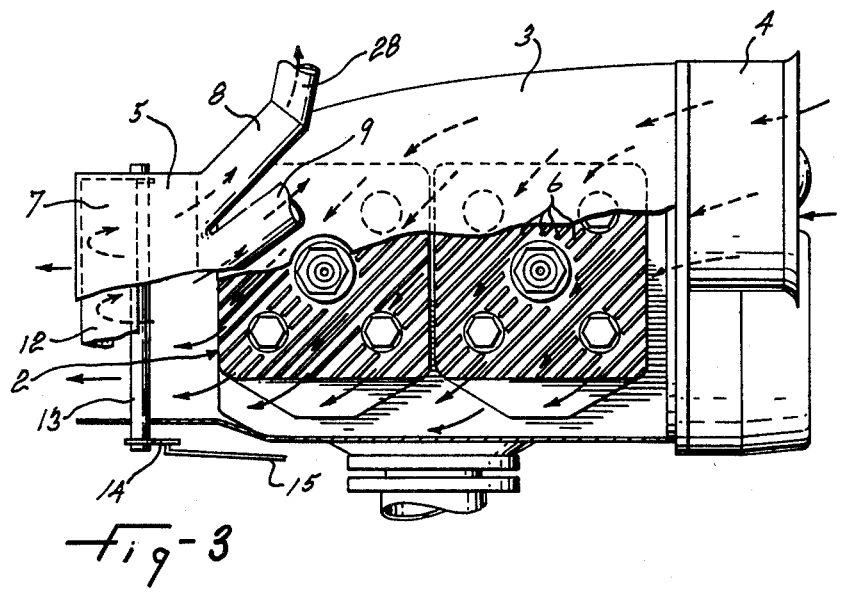
FIG. 3 is a top view of the snowmobile engine with parts partly broken away.
Figure 4:
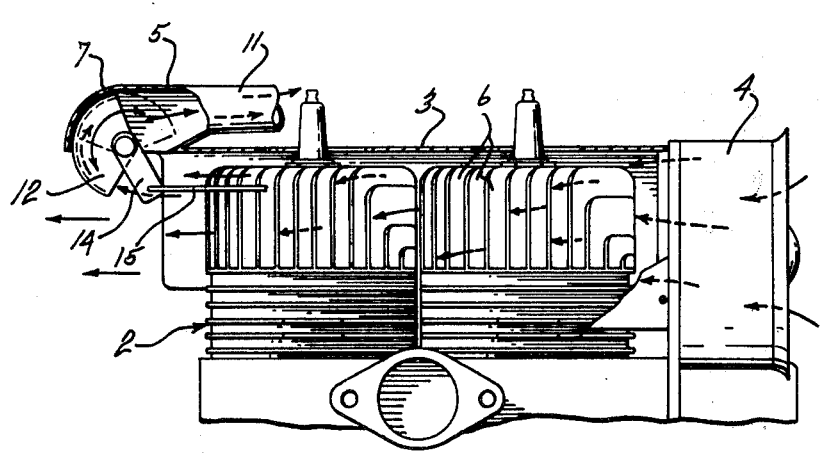
FIG. 4 is a side elevation view of the same engine still with parts broken away.
Figure 5:
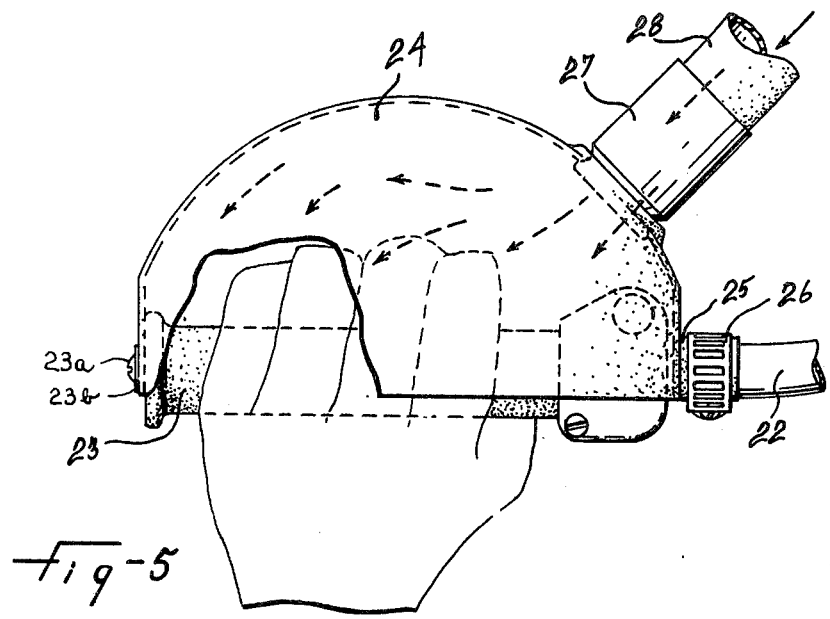
FIG. 5 is a top view of a heated air outlet for one hand of the driver.
Figure 6:
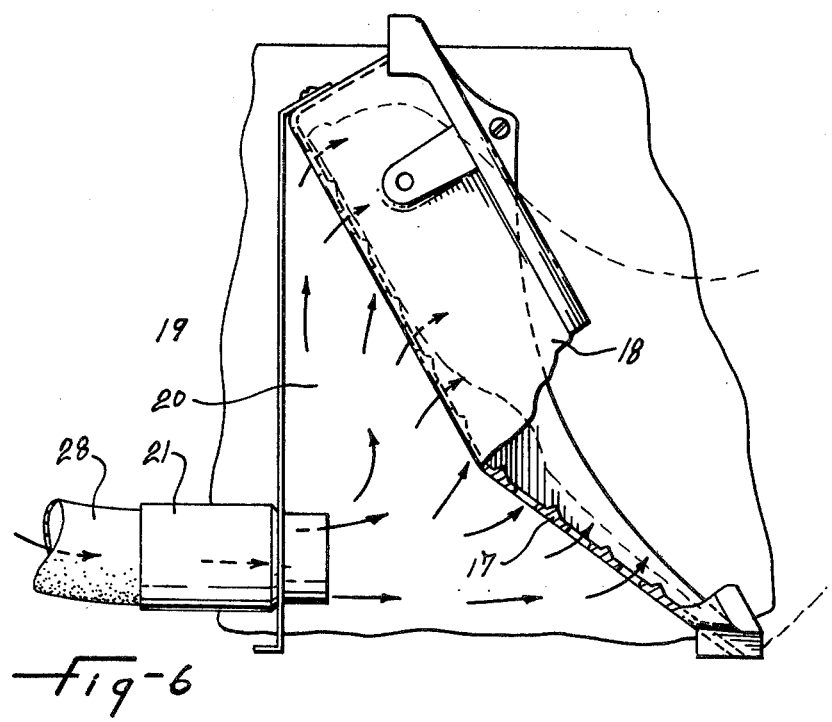
FIG. 6 is a side view of a heated air outlet for one foot of the driver.

The illustrated snowmobile 1 includes a heat distribution system operatively associated to the two-piston engine 2. A cowl 3 is fixed over the engine 2 and spaced above the latter to form a cooling air passage between the cowl and the engine. A fan 4 is fixed at one end of the air passage to force a flow of air into the passage. A heated air manifold 5 is fixed to the opposite end of the cowl 3 relative to the fan 4; in other words, downstream relative to the path of the cooling air in the afore-mentioned passage. Thus, the cooling air travels in the direction of the arrows in FIGS. 3 and 4 and is heated under the effect of the fins 6 fixed on top of the engine. Thus, the heated air manifold 5 registers with the air which has been heated by the engine 2. The maniforld 5 has a cylindrical section 7 merging into four manifold outlets 8, 9, 10, and 11.

An air deflector plate 12 is fixed to a pin 13 for pivotal movement therewith in the manifold 5 about an axis extending transversely of the air path. The cylindrical section 7 of the manifold and the air deflector plate 12 are curved around the axis defined by the pin 13 and are coaxial with the latter. A control arm 14 is fixed to the pin 13 and is connected by a suitable link 15, such as a push pull cable, to a manual control 16 for selective pivoting of the deflector plate 12. As best seen from FIG. 4, the amount of insertion of the deflector plate 12 transversely into the air path may thus be selectively adjusted in accordance with the amount of heated air required. The concave side of the deflector plate 12 faces upstream relative to the air path to produce curved deflection of heated air toward the outlets 8, 9, 10, and 11.

The snowmobile is provided with a pair of grilles 17 forming foot-rests on opposite sides thereof respectively. Each grille 17 is formed with a raised edge 18 and is inclined to comfortably hold the foot of the snowmobile driver. A plate 19 is secured in front of each grille 17 and forms a heated air compartment 20 in cooperation therewith and with the snowmobile body. The plate 19 if formed with a tubular air inlet 21.

The snowmboile also includes steering handles 22 covered at the outer end by the usual hand grip member 23. A substantially hemispherical or bowl-shape member 24, preverably made of plastic and formed with a neck portion 25, is fixed to each handle 22. A clamp 26 tightens the neck portion 25 around the corresponding handle. The other end of member 24 is fixed to the outer end of hand grip member 23 by means of a screw 23a and washer 23b. Each bowl-shape member 24 forms a cavity for the insertion of the hand around the hand grip member 23. The cavity of each member 24 faces rearwardly and slightly upward, as best shown in FIG. 1 and 2, to allow safe disengagement of the hands therefrom in emergency cases. Besides, this alignment of the bowl-shape members 24 allows to direct the heated air toward the chest and face of the snowmobile drive after circulation around his hands. Each bowl-shape member 24 is provided with a tubular air inlet 27.

Four flexible air tubes or conduits 28 connect the manifold coutlets 8, 9, 10, and 11 to the heated air inlets 21 and 27 respectively. Thus, the two foot-rest grilles 17 and the two bowl-shape members 24 form heater air outlets arranged to heat four different body portions of the snowmobile driver; that is, the feet and the hands.

It must be noted that changes in the details of construction may be made without departing rrom the spirit and scope of the present invention defined in the appended claims. For instance, the number of heated air outlets may be changed such as to heat only the hands or the feet. Each manifold outlet 8, 9, 10 or 11 could be provided with a damper to adjust the distribution of heater air amont the four tubes 28 and outlets 17 and 24. The hand receiving and protecting receptacles 24 can have other shapes than those shown in the drawing, such as rectangular or square.

I claim:

1. A snowmobile comprising an air-cooled engine, a cowl secured to and forming a cooling air passage against the engine, a heated air manifold connected to the engine cowl, heated air outlets being adapted to be positioned adjacent body portions respectively of a driver operating the snowmobile, heated air conduits leading from the heated air manifold to the heated air outlets respectively, a pair of steering handles, a pair of foot rests, and said heated air outlets being positioned at the steering handles and foot-rests respectively, thereby being adapted for supplying heated air at the hands and feet constituting said body portions of the driver, said heated air manifold having a deflector member adjustably mounted in said manifold and adjustably operatively positioned in the path of the heated air issuing from said cooling air passage and deflecting heated air into said manifold, and a hand control is connected to said deflector member for adjustment of the transverse insertion thereof into said path to adjustably vary the supply of heated air at said body portions.

2. A snowmobile as defined in claim 1, wherein said deflector member is pivoted about an axis extending transversely of said path.

3. A snowmobile as defined in claim 2, wherein said deflector member constitutes a plate curved around said transverse axis and having a concave side operatively facing toward the oncoming heated air in said passage to curvingly deflect heated air into the heated air manifold, and a link connects said hand control to said curved deflector plate for selective adjustment of the latter.

4. A snowmobile as defined in claim 1, wherein the heated air outlets positioned at the steering handles constitute each a bowl-shape hand-receiving receptacle having a neck portion clamped to the corresponding steering handle and each also having a heated air inlet connected to one of said heated air conduits, the heated air outlets positioned at the foot-rests respecively include each a foot-rest grille and a front plate cooperatively forming a heated air compartment with each other and with the body of the snowmobile, and each front plate is formed with a heated air inlet operatively connected to another of the heated air conduits.

* * * * *